(12) United States Patent
Hara

(10) Patent No.: US 10,120,059 B2
(45) Date of Patent: Nov. 6, 2018

(54) FEEDBACK GAIN ADJUSTING METHOD AND DEVICE OF TRACKING-TYPE LASER INTERFEROMETER AND TRACKING-TYPE LASER INTERFEROMETER

(71) Applicant: MITUTOYO CORPORATION, Kanagawa (JP)

(72) Inventor: Shinichi Hara, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/664,051

(22) Filed: Jul. 31, 2017

(65) Prior Publication Data

US 2018/0045806 A1 Feb. 15, 2018

(30) Foreign Application Priority Data

Aug. 10, 2016 (JP) ................................. 2016-157922

(51) Int. Cl.
*G01S 17/66* (2006.01)
*G01S 3/786* (2006.01)

(52) U.S. Cl.
CPC .............. *G01S 3/786* (2013.01); *G01S 17/66* (2013.01)

(58) Field of Classification Search
CPC ....... G01S 17/66; G01B 11/02; G01B 11/026; G01B 11/14
See application file for complete search history.

(56) References Cited

U.S. PATENT DOCUMENTS

| 7,920,273 | B2 | 4/2011 | Hara | |
|---|---|---|---|---|
| 2008/0316497 | A1* | 12/2008 | Taketomi | G01C 15/002 356/498 |
| 2009/0237674 | A1 | 9/2009 | Hara | |
| 2011/0069319 | A1* | 3/2011 | Nara | G01S 7/4811 356/500 |

FOREIGN PATENT DOCUMENTS

| JP | S63-231286 A | 9/1988 |
|---|---|---|
| JP | 2007-057522 A | 3/2007 |
| JP | 2009-229066 A | 10/2009 |

* cited by examiner

*Primary Examiner* — Jonathan Hansen
(74) *Attorney, Agent, or Firm* — Greenblum & Bernstein, P.L.C.

(57) ABSTRACT

A laser interferometer that includes a laser interferometer, an position sensitive detector detecting an offset of an optical axis of the laser interferometer, a biaxial rotator turning the laser interferometer toward an arbitrary direction, an angle sensor detecting a rotation angle of the biaxial rotator, a retro reflector reflecting reflected light in a direction parallel to incident light, and a controller performing feedback control of the biaxial rotator so as to track the retro reflector based on signals from the position sensitive detector and the angle sensor. The tracking-type laser interferometer starts tracking control when return light from the retro reflector is returned to a detection range of the position sensitive detector, and changes gain for the feedback control in accordance with a behavior for a position of the return light on the position sensitive detector due to the tracking control.

11 Claims, 9 Drawing Sheets

FEEDBACK GAIN ADJUSTING METHOD AND DEVICE OF TRACKING-TYPE LASER INTERFEROMETER AND TRACKING-TYPE LASER INTERFEROMETER

CROSS-REFERENCE TO RELATED APPLICATIONS

The present application claims priority under 35 U.S.C. § 119 of Japanese Application No. 2016-157922, filed on Aug. 10, 2016, the disclosure of which is expressly incorporated by reference herein in its entirety.

BACKGROUND OF THE INVENTION

1. Field of the Invention

The present invention relates to a feedback gain adjusting method and a feedback gain adjusting device of a tracking-type laser interferometer and a tracking-type laser interferometer. Particularly, the present invention relates to a feedback gain adjusting method and a feedback gain adjusting device of a tracking-type laser interferometer and a tracking-type laser interferometer, which can stabilize an optical axis tracking control system of the tracking-type laser interferometer by optimizing feedback gain of tracking control without using an absolute distance between a retro reflector and the laser interferometer.

2. Description of Related Art

A tracking-type laser interferometer is known which is configured by a laser interferometer mounted with an position sensitive detector detecting an offset amount of an optical axis of return light, a biaxial rotation mechanism turning the laser interferometer toward an arbitrary direction, and a retro reflector such as a retro reflector fixated to a measured object (see Japanese Patent Laid-open Publication No. S63-231286 and Japanese Unexamined Patent Publication No. 2007-057522 ). In this example, the retro reflector is an optical element in which reflected light returns parallel to incident light (also referred to as measurement light). The incident light becomes coaxial with emitted light when reflected at a center of the retro reflector. Therefore, based on an output of the position sensitive detector, an interference length measurement is possible in the arbitrary direction by controlling the biaxial rotation mechanism such that the offset amount of the optical axis is 0.

As shown in FIG. 1, a common tracking-type laser interferometer is configured to include a laser interferometer 101 (referred to simply as an interferometer), a measurement head 103 having an position sensitive detector 102 installed which detects the offset amount between the optical axes of the measurement light and the reflected light, a biaxial rotation mechanism 104 turning the measurement head 103 to the arbitrary direction, an angle sensor 105 detecting a rotation angle of the biaxial rotation mechanism 104, a retro reflector 107 fixated to a measured object 106, and a controller 108 which performs tracking of the measured object 106 and measurement data collection.

The controller 108 collects a distance signal from the interferometer 101, the optical axis offset amount from the position sensitive detector 102, and an angle signal from the biaxial rotation mechanism 104 to drive the biaxial rotation mechanism 104 so as to keep the optical axis offset amount at 0.

When the retro reflector 107 is displaced, the reflected light (referred to as return light) returning to the interferometer 101 is shifted to be parallel to the measurement light and enters the interferometer 101. By using the position sensitive detector 102 detecting the offset of the optical axis at this point and the biaxial rotation mechanism 104, feedback control is performed such that the optical axis of the measurement light travels to the center of the retro reflector 107 and tracking control is performed.

While the rotation angle is required to control the biaxial rotation mechanism 104, the feedback control is performed using the optical axis offset, and therefore, gain of a control system may become excessive or insufficient based on an absolute distance between the retro reflector 107 and the laser interferometer 101.

Accordingly, the absolute distance between the retro reflector and the laser interferometer needs to be entered using some method and an inventor suggests an absolute distance estimation method in Japanese Patent Laid-open Publication No. 2009-229066.

However, until the absolute distance is entered, the optical axis tracking control system of the tracking-type laser interferometer is unstable.

SUMMARY OF THE INVENTION

The present invention has been conceived in order to resolve the conventional concern mentioned above, and is configured to stabilize an optical axis tracking control system of a tracking-type laser interferometer by optimizing feedback gain of tracking control without using an absolute distance between a retro reflector and a laser interferometer.

The present invention provides a tracking-type laser interferometer that includes a laser interferometer, an position sensitive detector detecting an offset of an optical axis of the laser interferometer, a biaxial rotation mechanism turning the laser interferometer toward an arbitrary direction, an angle sensor detecting a rotation angle of the biaxial rotation mechanism, a retro reflector reflecting reflected light in a direction parallel to incident light, and a controller performing feedback control of the biaxial rotation mechanism so as to track the retro reflector based on signals from the position sensitive detector and the angle sensor. The tracking-type laser interferometer starts tracking control when return light from the retro reflector is returned to a detection range of the position sensitive detector, and changes gain for the feedback control in accordance with a behavior for a position of the return light on the position sensitive detector due to the tracking control.

In this example, an amount of time taken for the position of the return light to reach a center of the position sensitive detector from a circumference thereof due to the tracking control is referred to as a settling time, and when the settling time is more than a predetermined time, the gain for the feedback control can be increased.

In addition, a method of increasing the gain for the feedback control can be changed based on the settling time.

Further, when the position of the return light jumps out of the detection range of the position sensitive detector due to the tracking control, the gain for the feedback control can be decreased.

Furthermore, a method of decreasing the gain for the feedback control can be changed based on a jumping out time required for the position of the return light to jump out of the detection range of the position sensitive detector due to the tracking control.

The present invention provides a tracking-type laser interferometer that includes the laser interferometer, the position sensitive detector detecting the offset of the optical axis of the laser interferometer, the biaxial rotation mechanism turning the laser interferometer toward the arbitrary direction, the angle sensor detecting the rotation angle of the biaxial rotation mechanism, the retro reflector reflecting reflected light in the direction parallel to the incident light, and the controller performing the feedback control of the biaxial rotation mechanism so as to track the retro reflector based on signals from the position sensitive detector and the angle sensor. The present invention provides a feedback gain adjusting device of the tracking-type laser interferometer that includes a method to start the tracking control when the return light from the retro reflector is returned to the detection range of the position sensitive detector, and a method to change the gain for the feedback control in accordance with the behavior for the position of the return light on the position sensitive detector due to the tracking control.

In this example, the feedback gain adjusting device can provide a method that measures the settling time required for the position of the return light to reach the center of the position sensitive detector from the circumference thereof due to the tracking control, and a method to increase the gain for the feedback control when the settling time is at least a predetermined time.

In addition, a method can be provided to change the method of increasing the gain for the feedback control based on the settling time.

Further, when the position of the return light jumps out of the detection range of the position sensitive detector due to the tracking control, a method can be provided to change the method of decreasing the gain for the feedback control.

Furthermore, a method to measure the time required for the position of the return light to jump out of the detection range of the position sensitive detector due to the tracking control, and a method to change the method of decreasing the gain for the feedback control based on the jumping out time can be provided.

The present invention further provides a tracking-type laser interferometer that includes the laser interferometer, an position sensitive detector detecting an offset of an optical axis of the laser interferometer, a biaxial rotation mechanism turning the laser interferometer toward an arbitrary direction, an angle sensor detecting a rotation angle of the biaxial rotation mechanism, a retro reflector reflecting reflected light in a direction parallel to incident light, and a controller in which, when feedback control is performed on the biaxial rotation mechanism so as to track a behavior retro reflector based on signals from the position sensitive detector and a behavior angle sensor, the controller starts the tracking control when the return light from the retro reflector is returned to a detection range of the position sensitive detector, and changes the gain for the feedback control in accordance with a behavior for the position of the return light on the position sensitive detector due to the tracking control.

According to the present invention, an optical axis tracking control system of a tracking-type laser interferometer can be stabilized by optimizing feedback gain of optical axis tracking control, without using an absolute distance between a retro reflector and a laser interferometer.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described in detail with reference to the drawings. The present invention is not limited to the written embodiments and examples below. Configuration requirements in the following embodiments and examples may also include that which is readily conceivable by one skilled in the art, that which is substantially similar, and that which encompasses an equivalent scope. Furthermore, the configuration requirements disclosed in the following embodiments and examples may be combined as appropriate, or may be selectively employed as appropriate.

Figure 2:
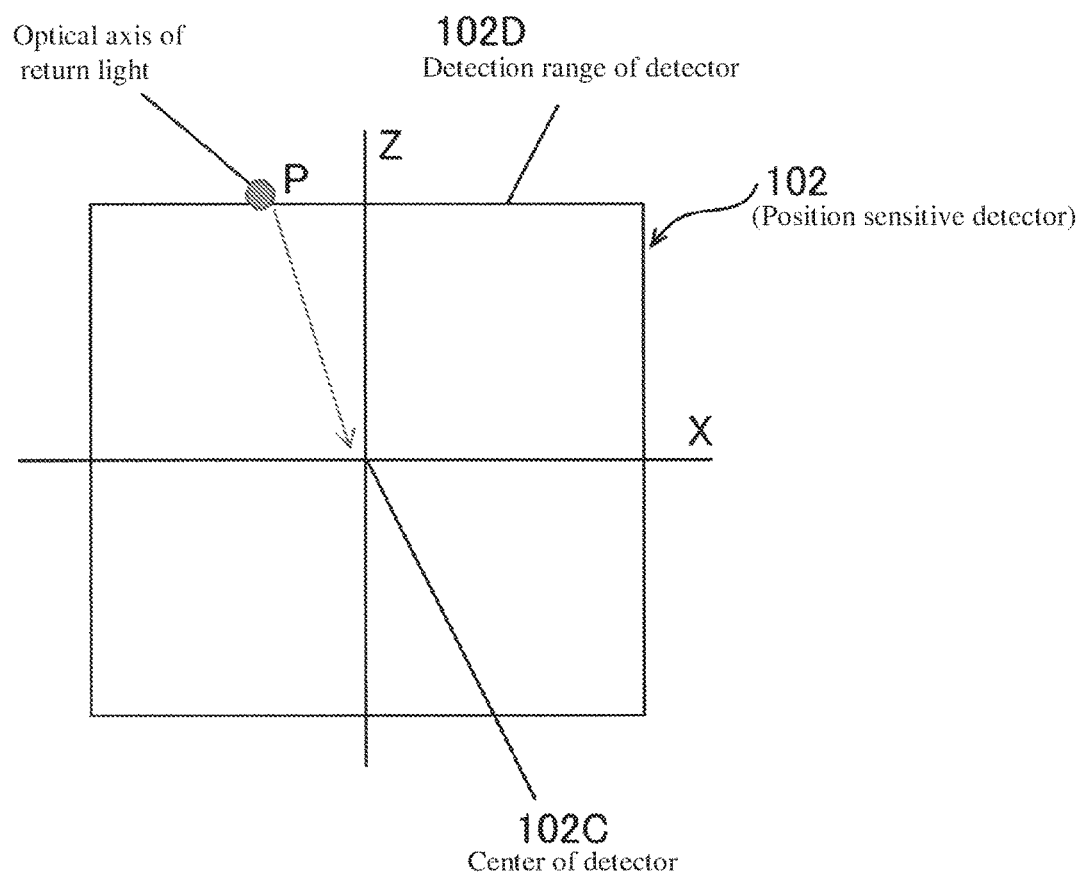
FIG. 2 is a front view of an position sensitive detector describing operation of the tracking-type laser interferometer.

FIG. 2 is a front view of an position sensitive detector 102.

Figure 1:
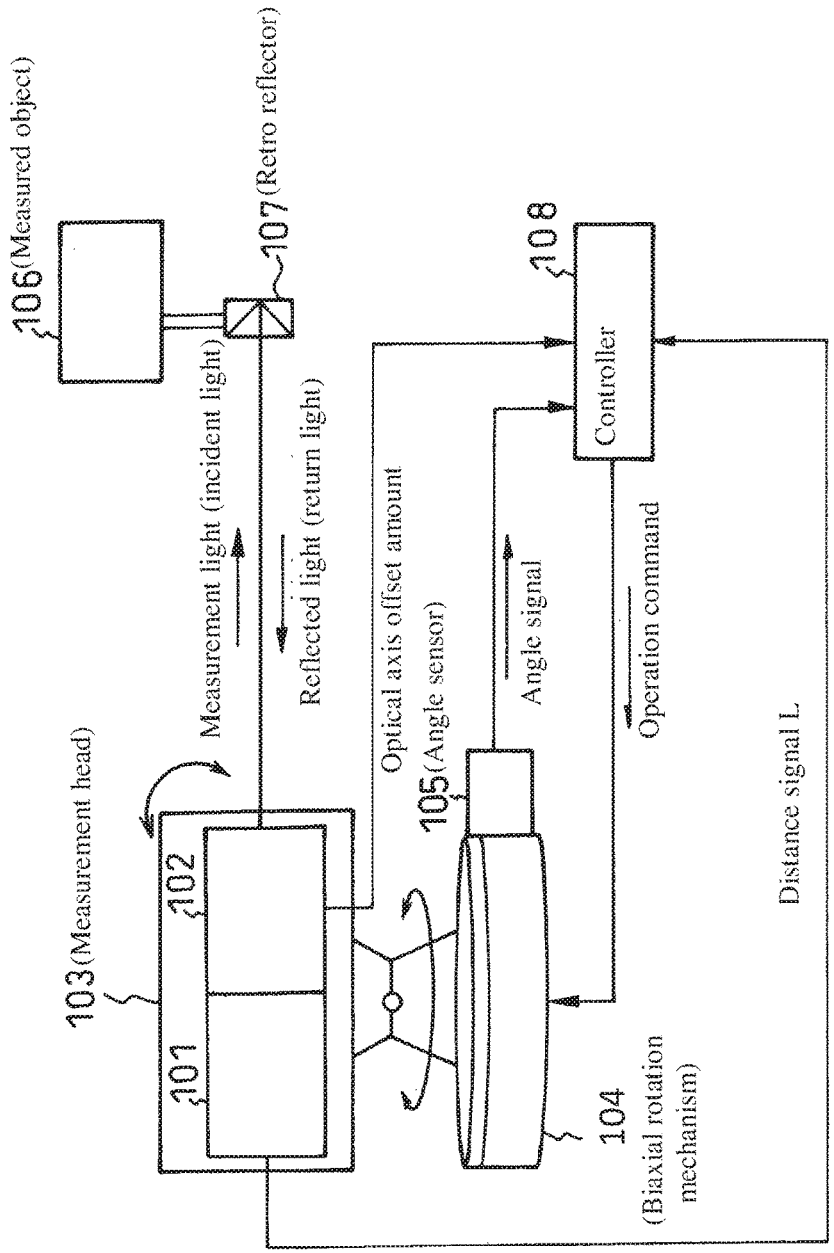
FIG. 1 illustrates a basic configuration of a tracking-type laser interferometer to which the present invention is applied.

Once an optical axis offset of return light enters a detection range 102D (in other words, a range in which tracking control is performed) of the position sensitive detector 102, a tracking-type laser interferometer starts the tracking control and the optical axis offset of the return light shifts toward a center of a sensor 102C. To do this, one of the following methods is used: a position of a retro reflector 107 shown in FIG. 1 is displaced such that the optical axis enters the center of the retro reflector 107; or a biaxial rotation mechanism/rotator 104 is operated so as to shift the optical axis toward a direction where the retro reflector 107 lies.

Figure 3:
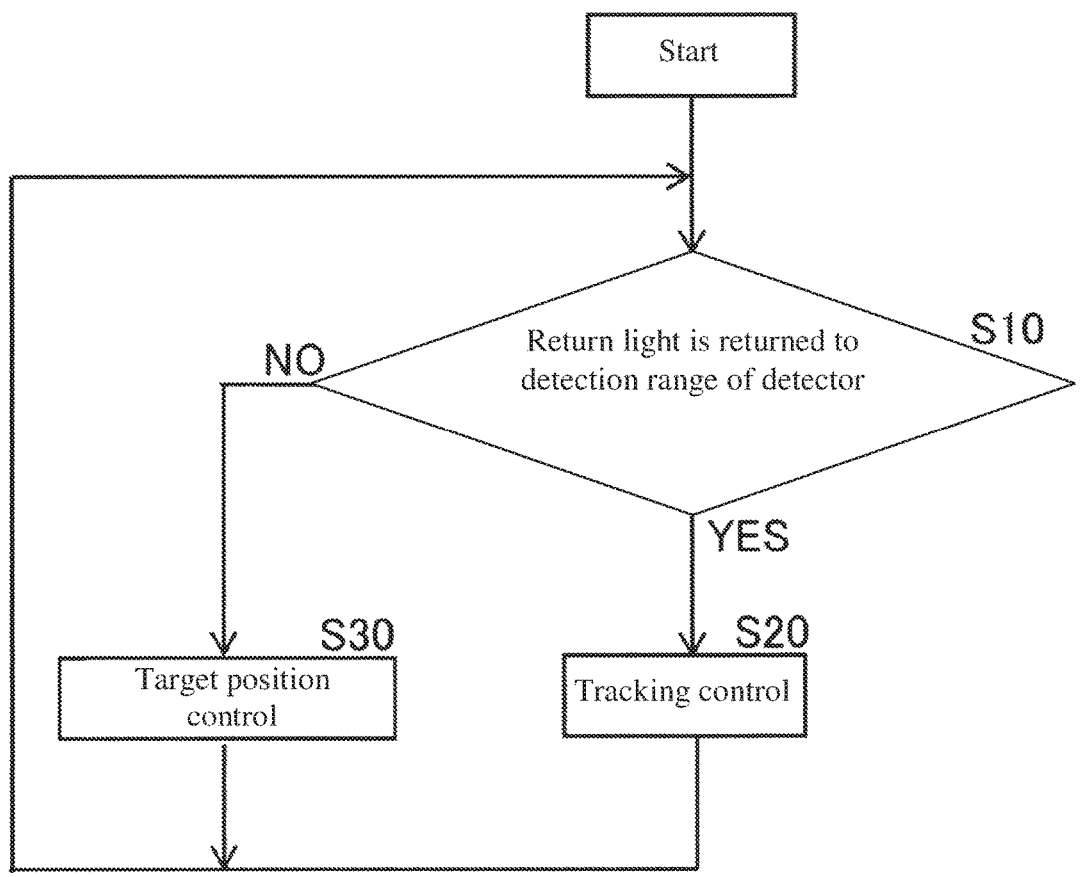
FIG. 3 is a flowchart illustrating a method of switching between tracking control and target position control of the tracking-type laser interferometer.

As shown in FIG. 3, when using either method, a determination is made as to whether the light is returned to the position sensitive detector 102 (step S10); target position control (also referred to as posture control) is performed when the optical axis of the return light is not found within the detection range 102D of the position sensitive detector 102 (step S30); the tracking control is started when the optical axis of the return light is detected at a position P in FIG. 2 for example (step S20); and the optical axis of the return light is shifted to the center 102C of the position sensitive detector 102.

Figure 4:
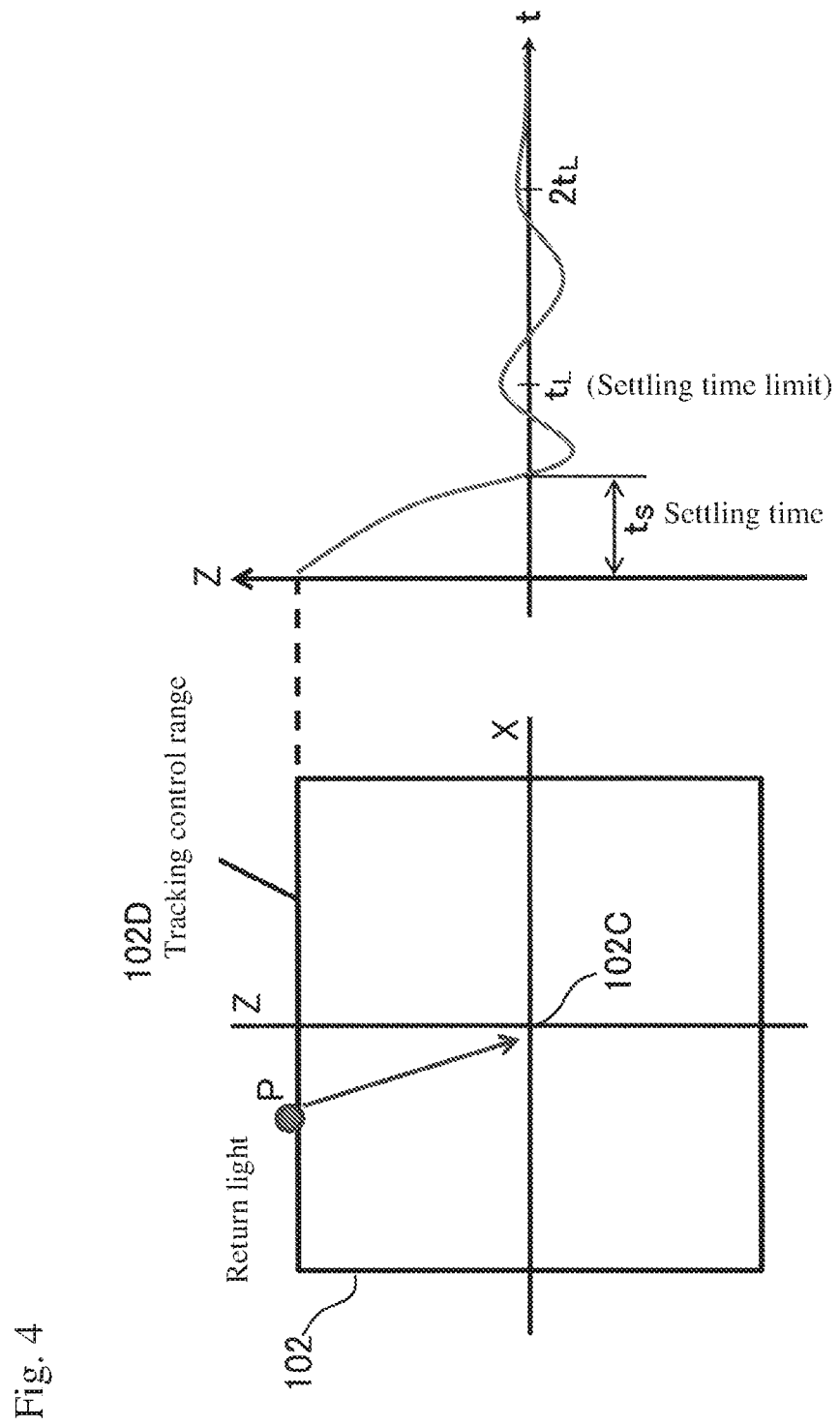
FIG. 4 illustrates a case where return light travels to a center of a sensor in order to describe a principle of the present invention.

As shown in FIG. 4, a motion of the optical axis of the return light at this point is an impulse response, and therefore, in the present invention, a control system is adjusted based on this response.

Figure 5:
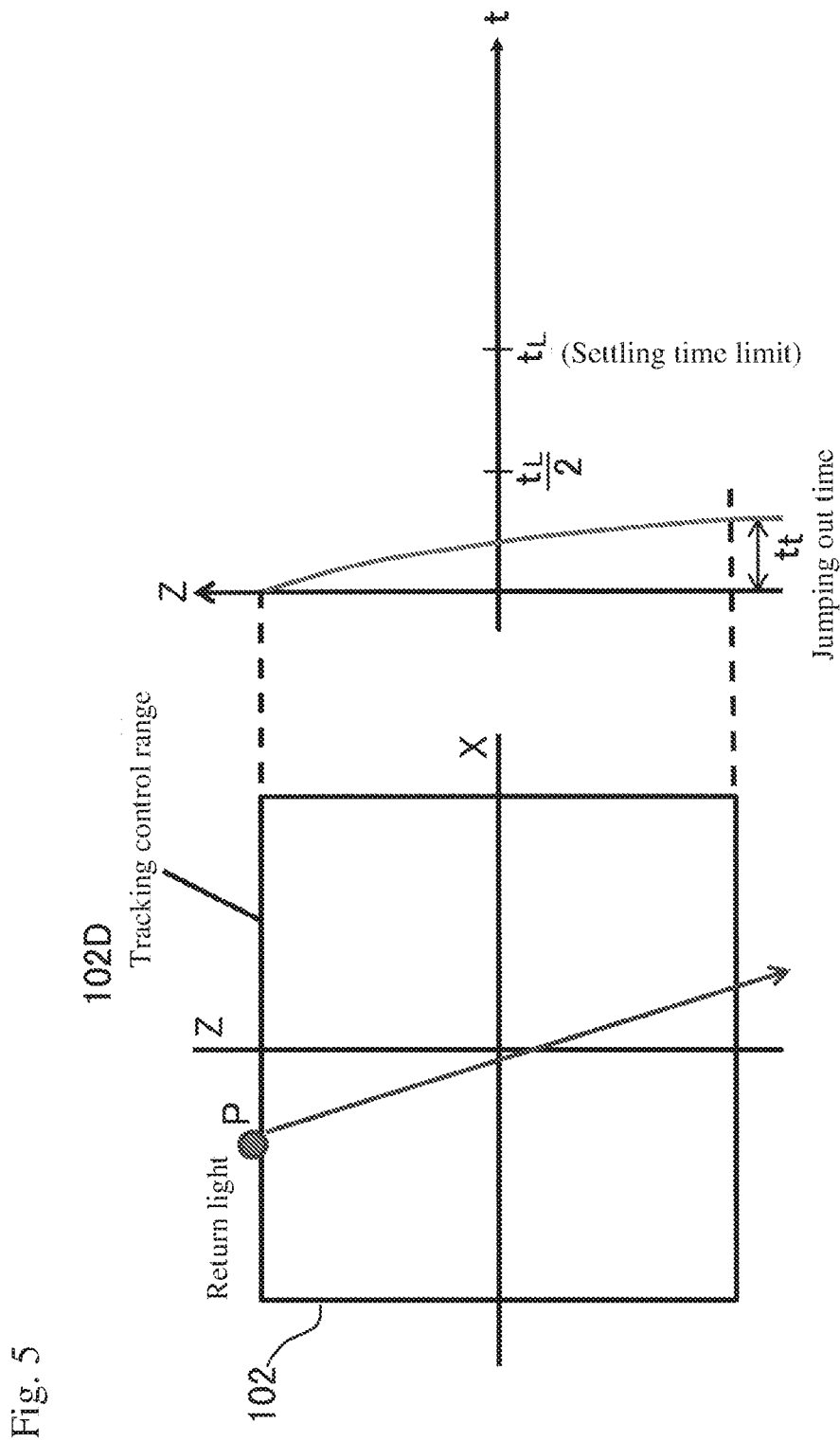
FIG. 5 illustrates a case where the return light jumps out of a detection range of the sensor in order to describe the principle of the present invention.

In contrast, as shown in FIG. 5, when the return light overshoots by a large amount and the light jumps out to the opposite side of the range 102D where the tracking control is performed, gain is excessive, and therefore, the gain is decreased.

Figure 6:
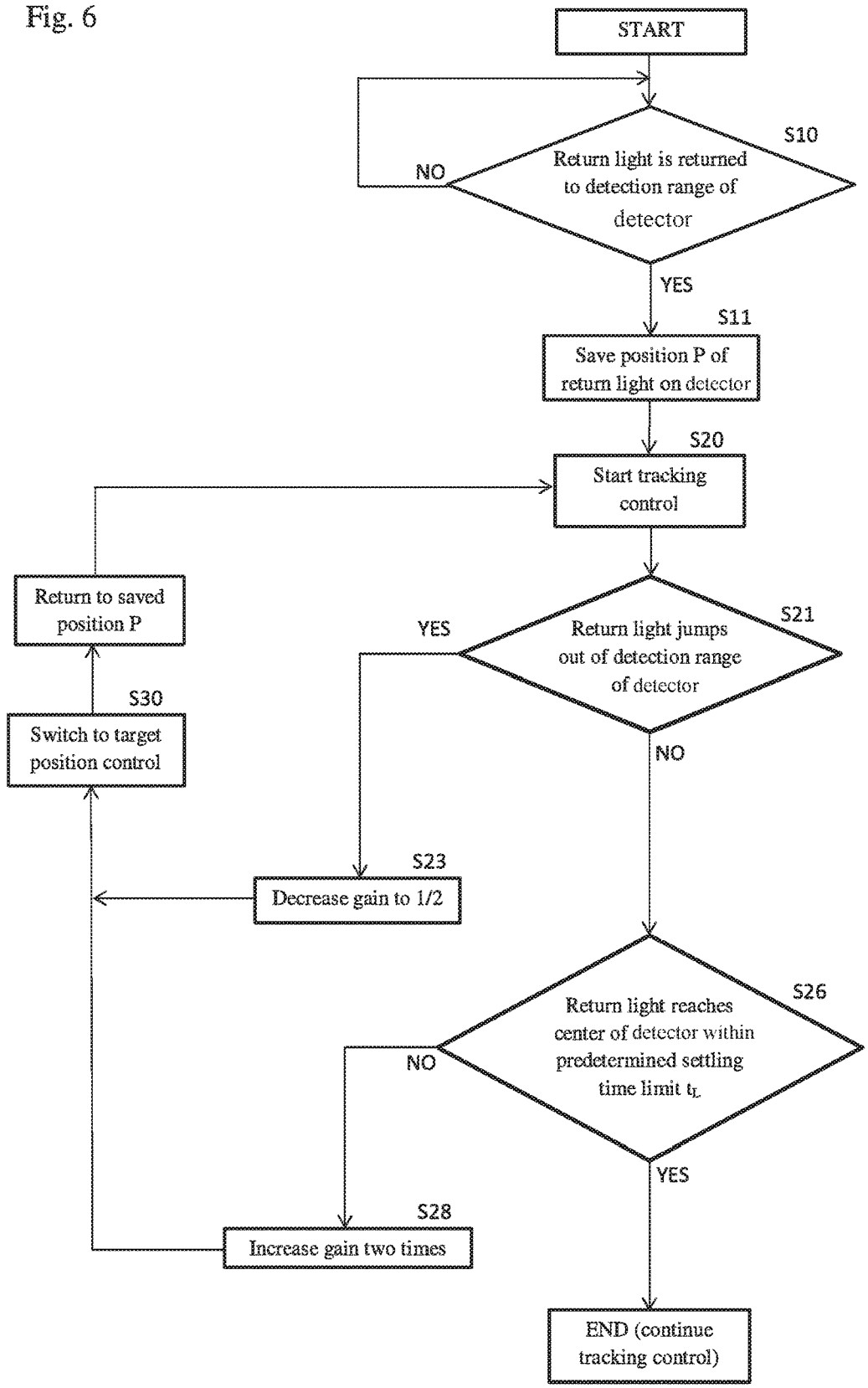
FIG. 6 is a flowchart illustrating a procedural flow according to a first embodiment of the present invention.

Hereafter, a procedural flow according to a first embodiment of the present invention is described with reference to FIG. 6.

When determined in step S10 that the return light is returned to the position sensitive detector 102, the process advances to step S11 and saves the position P of the return light at that point and starts the tracking control in step S20.

When the return light jumps out to the opposite side of the position sensitive detector 102 in step S21, as shown in FIG. 5, in step S23, the gain is decreased to ½ by a bisection method, for example, the process is switched to the target position control of step S30, the return light is returned to the position P saved in step S11, and the tracking control is started again in step S20.

In contrast, as shown in FIG. 4, when the optical axis of the return light reaches the center 102C of the position sensitive detector 102, a time $t_s$ required to reach the center 102C (referred to as settling time) is measured in step S26. When the optical axis fails to reach the center 102C within a predetermined settling time limit $t_L$, in step S28, the gain is increased two times by the bisection method, for example, the process is switched to the target position control of step S30, the return light is returned to the position P saved in step S11, and the tracking control is started again in step S20.

In contrast, when determined in step S26 that the optical axis of the return light reaches the center 102C of the sensor 102 within the predetermined settling time limit $t_L$, the gain adjustment is ended and the tracking control is continued.

In the first embodiment, the control is simple because the gain is adjusted by the bisection method.

Figure 7:
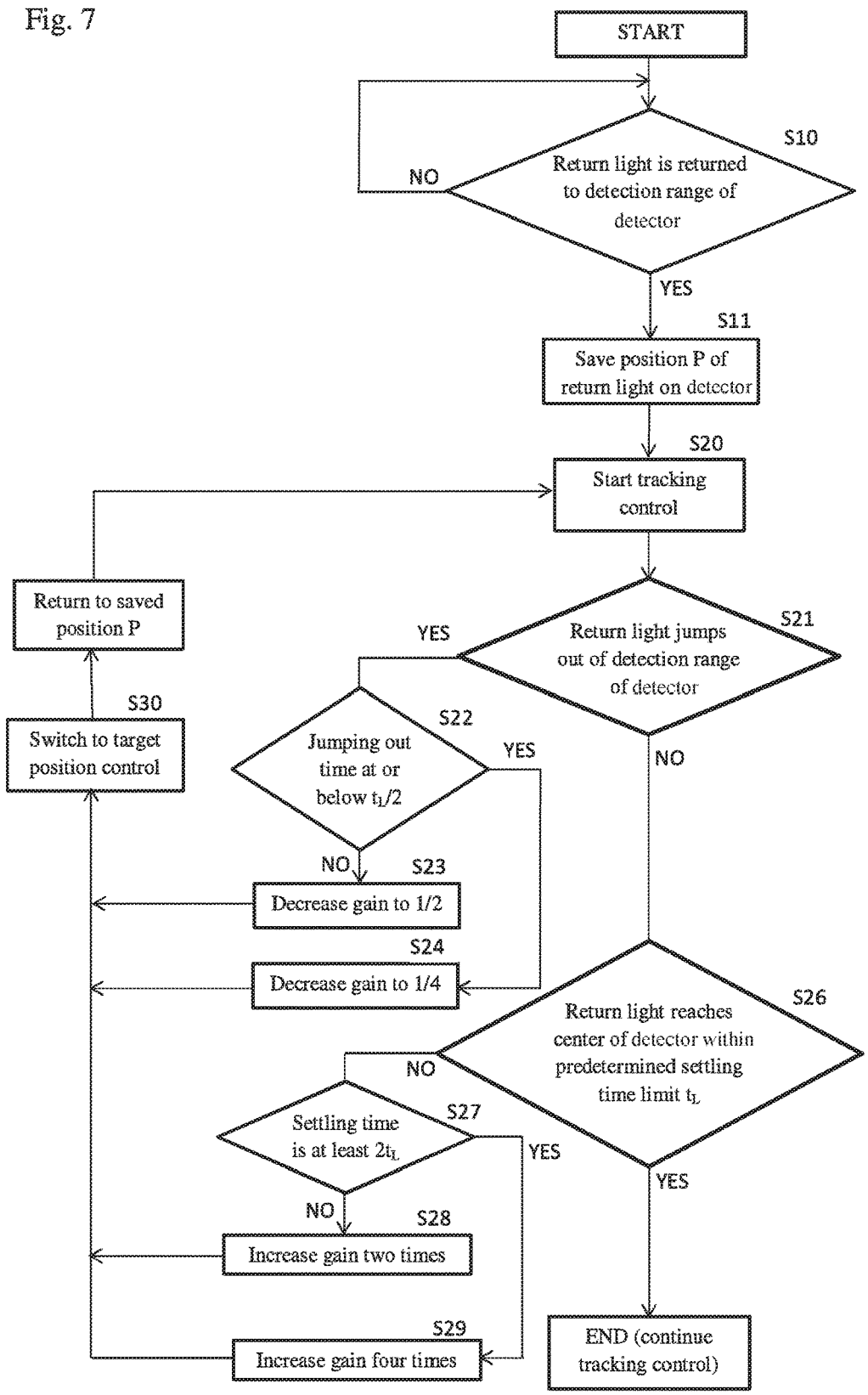
FIG. 7 is a flowchart illustrating a procedural flow according to a second embodiment of the present invention.

Next, a second embodiment of the present invention, in which the gain adjustment is quickly performed by improving the bisection method, is described with reference to FIG. 7.

In the second embodiment, in a step S21 similar to that of the first embodiment, when a determination is made that the overshoot is large and the optical axis of the return light jumps out of the detection range 102D of the sensor 102, as shown in FIG. 5, a time $t_t$ required to jump out of the detection range 102D after switching to the tracking control (referred to as jumping out time) is measured, and when the jumping out time $t_t$ is at or below $t_L/2$, which is half of the settling time limit $t_L$, for example, the process advances to step S24 and expedites convergence by decreasing the gain to ¼.

In contrast, in a step S26 similar to that of the first embodiment, when a determination is made that the optical axis fails to reach the center 102C within the settling time limit $t_L$ for example, and in step S27, when the settling time $t_s$ is determined to be at least two times the settling time limit $t_L$ for example, and at least two times the amount of time is required, the gain is increased by four times in step S29 to expedite the convergence.

Figure 8:
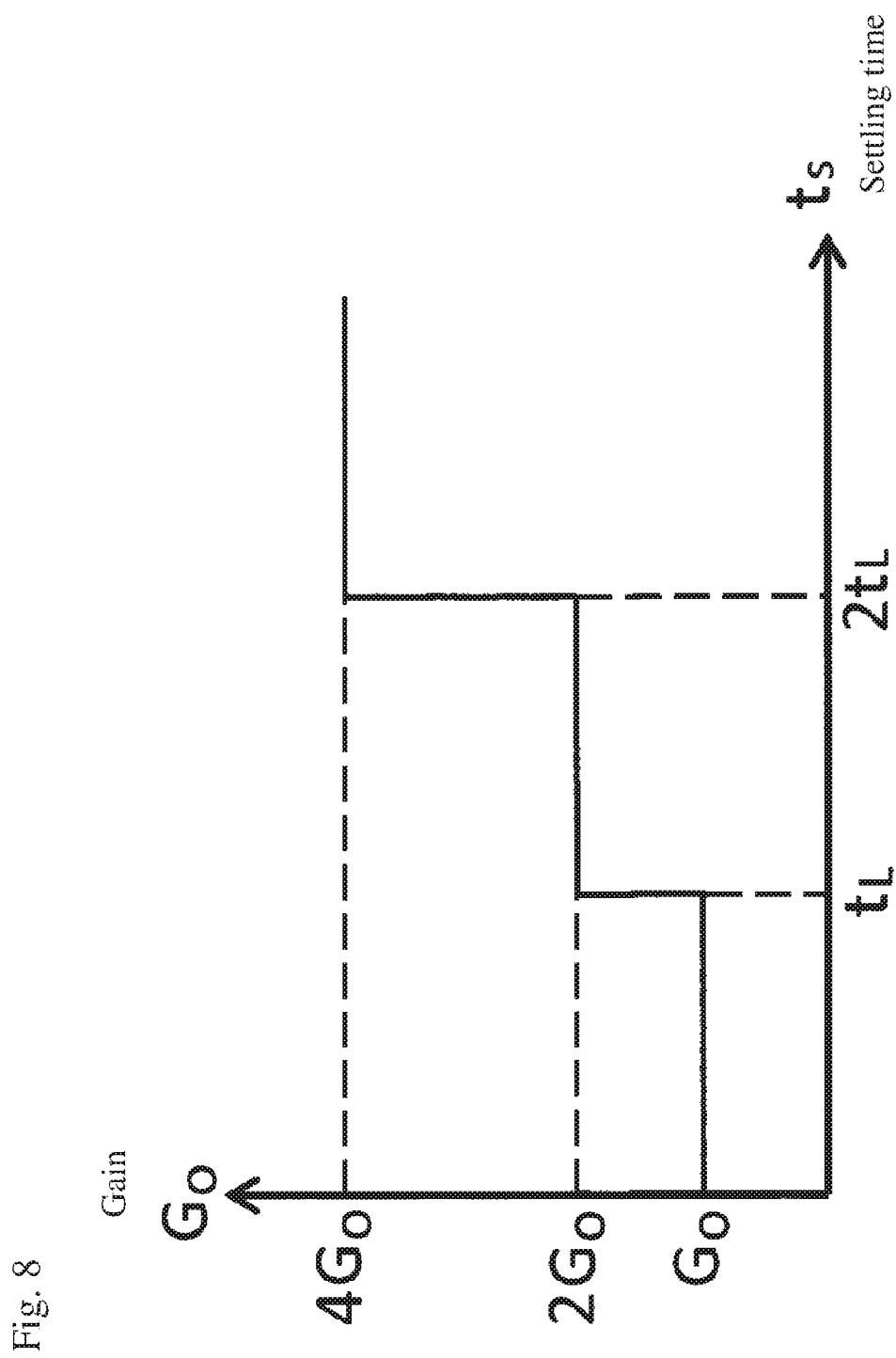
FIG. 8 illustrates an example of gain switching in response to settling time according to the second embodiment.
Figure 9:
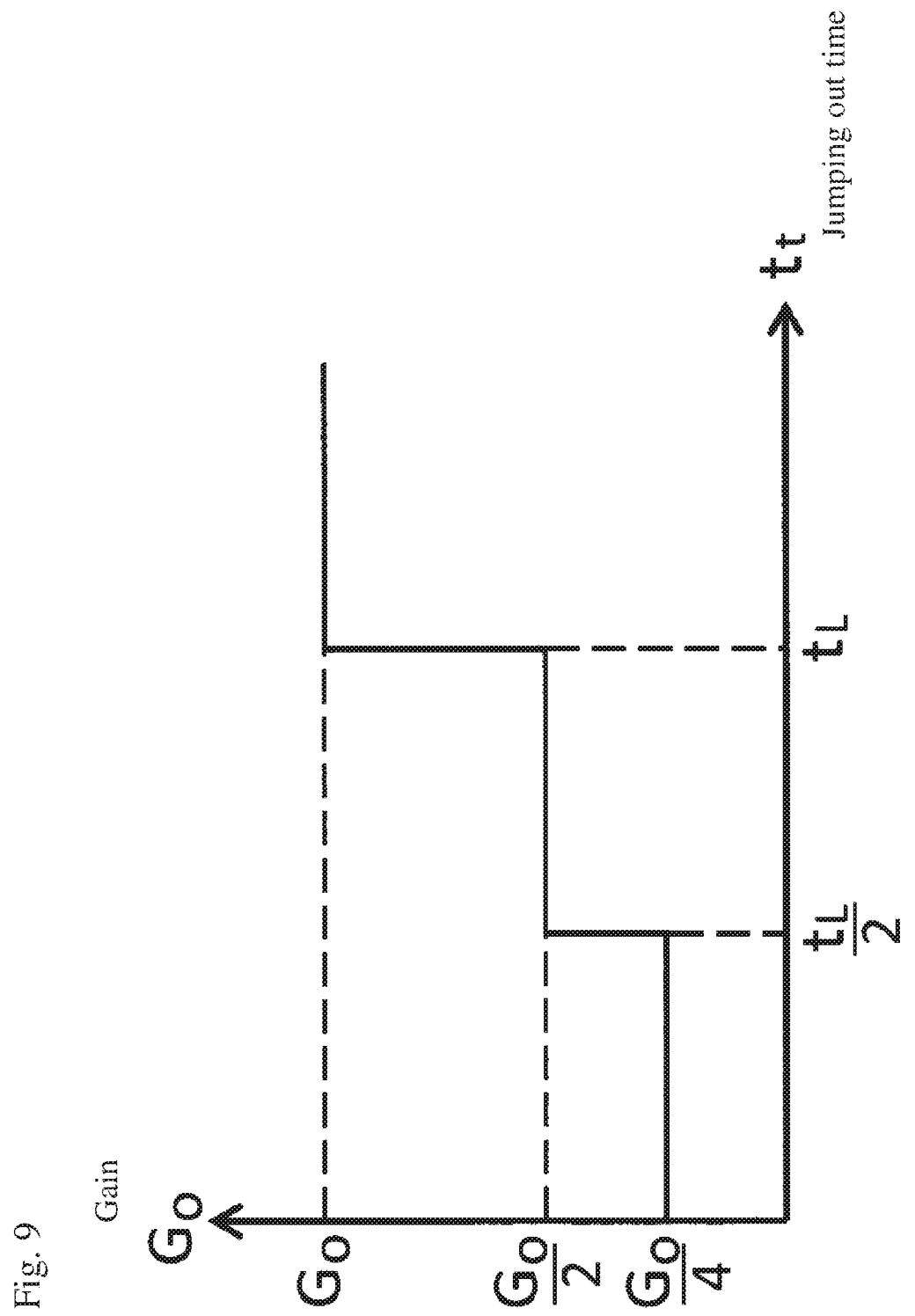
FIG. 9 illustrates the example of gain switching in response to jumping out time according to the second embodiment.

A relationship of the settling time $t_s$ and gain $G_o$ according to the second embodiment is shown in FIG. 8 and a relationship of the jumping out time $t_t$ and the gain $G_o$ is shown in FIG. 9.

In this way, by expediting the change of the gain $G_o$ based on the settling time $t_s$ or jumping out time $t_t$, adjustment of the gain $G_o$ is possible in a short amount of time compared to the simple bisection method.

A method of changing the gain $G_o$ based on the settling time $t_s$ or the jumping out time $t_t$ is not limited to this. For example, the settling time limit $t_L$ can be changed when settled as shown in FIG. 4 and when jumped out as shown in FIG. 5, for example, or it is possible to expedite only one of the setting time $t_s$ and the jumping out time $t_t$.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A feedback gain adjusting method of a tracking-type laser interferometer, the tracking-type laser interferometer including:
   a laser interferometer,
   a position sensitive detector detecting an offset of an optical axis of the laser interferometer,
   a biaxial rotator turning the laser interferometer toward an arbitrary direction,
   an angle sensor detecting a rotation angle of the biaxial rotator,
   a retro reflector reflecting reflected light in a direction parallel to incident light, and
   a controller performing feedback control of the biaxial rotator so as to track the retro reflector based on signals from the position sensitive detector and the angle sensor,
   the method comprising:
   starting tracking control when return light from the retro reflector is returned to a detection range of the position sensitive detector; and
   changing gain for the feedback control in accordance with a behavior for a position of the return light on the position sensitive detector due to the tracking control.

2. The feedback gain adjusting method of the tracking-type laser interferometer according to claim 1, further comprising increasing the gain for the feedback control when an amount of settling time required for the position of the return light to reach a center of the position sensitive detector from a circumference thereof due to the tracking control is at least a predetermined time.

3. The feedback gain adjusting method of the tracking-type laser interferometer according to claim 2, wherein the increasing the gain for the feedback control is changed based on the settling time.

4. The feedback gain adjusting method of the tracking-type laser interferometer according to claim 1, further comprising decreasing the gain for the feedback control when the position of the return light jumps out of the detection range of the position sensitive detector due to the tracking control.

5. The feedback gain adjusting method of the tracking-type laser interferometer according to claim 4, wherein the decreasing the gain for the feedback control is changed based on a jumping out time required for the position of the return light to jump out of the detection range of the position sensitive detector due to the tracking control.

6. A feedback gain adjusting device of a tracking-type laser interferometer, the tracking-type laser interferometer comprising:
a laser interferometer;
a position sensitive detector configured to detect an offset of an optical axis of the laser interferometer;
a biaxial rotator configured to turn the laser interferometer toward an arbitrary direction;
an angle sensor configured to detect a rotation angle of the biaxial rotator;
a retro reflector configured to reflect reflected light in a direction parallel to incident light; and
a controller configured to perform feedback control of the biaxial rotator so as to track the retro reflector based on signals from the position sensitive detector and the angle sensor, wherein:
tracking control is started when return light from the retro reflector is returned to a detection range of the position sensitive detector, and
gain for the feedback control is changed in accordance with a behavior for a position of the return light on the position sensitive detector due to the tracking control.

7. The feedback gain adjusting device of the tracking-type laser interferometer according to claim 6, wherein the controller is further configured to:
measure an amount of settling time required for the position of the return light to reach a center of the position sensitive detector from a circumference thereof due to the tracking control, and
increase the gain for the feedback control when the settling time is at least a predetermined time.

8. The feedback gain adjusting device of the tracking-type laser interferometer according to claim 7, wherein the controller is further configured to increase the gain for the feedback control based on the settling time.

9. The feedback gain adjusting device of the tracking-type laser interferometer according to claim 6, wherein the controller is further configured to decrease the gain for the feedback control when the position of the return light jumps out of the detection range of the position sensitive detector due to the tracking control.

10. The feedback gain adjusting device of the tracking-type laser interferometer according to claim 9, wherein the controller is further configured to:
measure an amount of time required for the position of the return light to jump out of the detection range of the position sensitive detector due to the tracking control, and
decrease the gain for the feedback control based on the jumping out time.

11. A tracking-type laser interferometer comprising:
a laser interferometer;
a position sensitive detector configured to detect an offset of an optical axis of the laser interferometer;
a biaxial rotator configured to turn the laser interferometer toward an arbitrary direction;
an angle sensor configured to detect a rotation angle of the biaxial rotator;
a retro reflector configured to reflect reflected light in a direction parallel to incident light; and
a controller configured to, when feedback control is performed on the biaxial rotator so as to track a behavior of the retro reflector based on signals from the position sensitive detector and the angle sensor:
start tracking control when return light from the retro reflector is returned to a detection range of the position sensitive detector, and
change gain for the feedback control in accordance with a behavior for the position of the return light on the position sensitive detector due to the tracking control.

* * * * *